(12) United States Patent
Toubiana et al.

(10) Patent No.: US 12,736,008 B2
(45) Date of Patent: Sep. 15, 2026

(54) SYSTEM FOR COOLING A LIQUID FOR LUBRICATING AN AIRCRAFT TURBOMACHINE

(71) Applicants: SAFRAN, Paris (FR); SAFRAN NACELLES, Gonfreville-l'Orcher (FR)

(72) Inventors: Ephraïm Toubiana, Moissy-Cramayel (FR); Samer Maalouf, Moissy-Cramayel (FR); Jean-Nicolas Pierre Bouchout, Moissy-Cramayel (FR)

(73) Assignees: SAFRAN, Paris (FR); SAFRAN NACELLES, Gonfreville-l'Orcher (FR)

( * ) Notice: Subject to any disclaimer, the term of this patent is extended or adjusted under 35 U.S.C. 154(b) by 256 days.

(21) Appl. No.: 18/720,959

(22) PCT Filed: Dec. 20, 2022

(86) PCT No.: PCT/FR2022/052439
§ 371 (c)(1),
(2) Date: Jun. 17, 2024

(87) PCT Pub. No.: WO2023/118730
PCT Pub. Date: Jun. 29, 2023

(65) Prior Publication Data

US 2025/0067216 A1 Feb. 27, 2025

(30) Foreign Application Priority Data

Dec. 21, 2021 (FR) ...................................... 2114130

(51) Int. Cl.
*F02C 7/14* (2006.01)
*B64D 33/08* (2006.01)
*F02C 7/06* (2006.01)

(52) U.S. Cl.
CPC ................ *F02C 7/14* (2013.01); *B64D 33/08* (2013.01); *F02C 7/06* (2013.01); *F05D 2260/20* (2013.01);
(Continued)

(58) Field of Classification Search
CPC ... B64D 33/08; F02C 7/06; F02C 7/14; F05D 2260/20; F05D 2260/208; F05D 2260/98
(Continued)

(56) References Cited

U.S. PATENT DOCUMENTS

2019/0014687 A1* 1/2019 Snyder ................. H05K 7/2039
2020/0122852 A1* 4/2020 Zebian .................... F02K 1/827
2021/0231057 A1* 7/2021 Livebardon ............ F02K 1/827

FOREIGN PATENT DOCUMENTS

EP 1 884 628 A2 2/2008
EP 2 291 067 A1 3/2011
(Continued)

OTHER PUBLICATIONS

International Search Report as issued in International Patent Application No. PCT/FR2022/052439, dated Apr. 26, 2023.

*Primary Examiner* — Joel M Attey
(74) *Attorney, Agent, or Firm* — CUSHMAN PARTNERS, LLC

(57) ABSTRACT

A system for cooling a liquid for lubricating an aircraft turbomachine, includes an exchanger including a cooling volume and a circuit for cooling a heat-transfer fluid by a loop for circulating the two-phase fluid, with thermocapillary pumping. The cooling circuit includes a condenser including channels connected in parallel to one another in order to make it possible to cool the fluid circulating in the condenser from a vapour state to a liquid state, a first capillary evaporator of the exchanger in order to absorb the heat of the lubricating liquid in the first volume, the first
(Continued)

evaporator including a capillary porous wick for separating the heat-transfer fluid in the two-phase state between a liquid state and a gaseous state by a capillary pressure jump.

13 Claims, 4 Drawing Sheets

(52) U.S. Cl.
CPC .... *F05D 2260/208* (2013.01); *F05D 2260/98* (2013.01)

(58) Field of Classification Search
USPC .................................................... 165/104.26
See application file for complete search history.

(56) References Cited

FOREIGN PATENT DOCUMENTS

| | | | |
|---|---|---|---|
| EP | 2 819 921 | A1 | 1/2015 |
| EP | 2 782 435 | B1 | 7/2017 |
| EP | 3 487 764 | A1 | 5/2019 |
| WO | WO 2013/128093 | A1 | 9/2013 |
| WO | WO 2018/015659 | A1 | 1/2018 |

* cited by examiner

[Fig. 1]
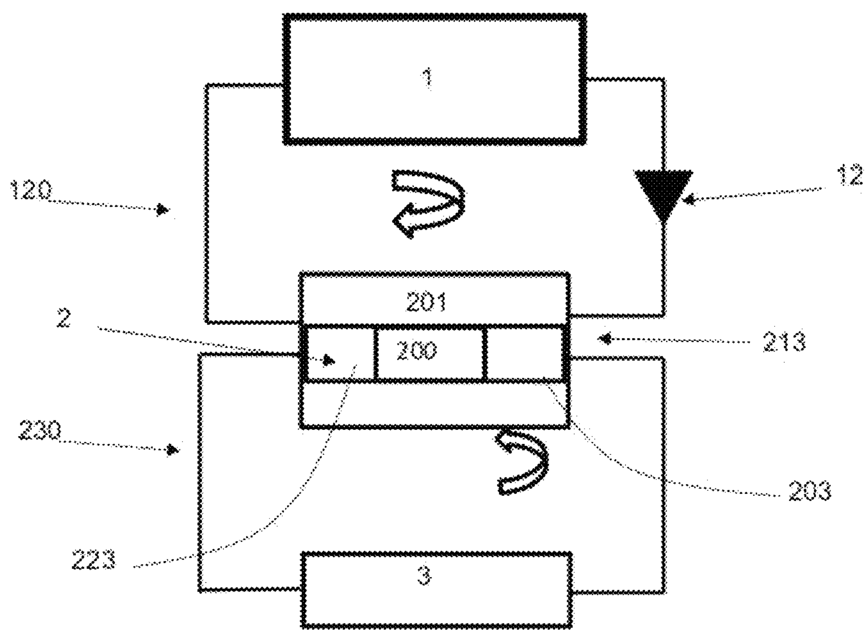
[Fig. 2]
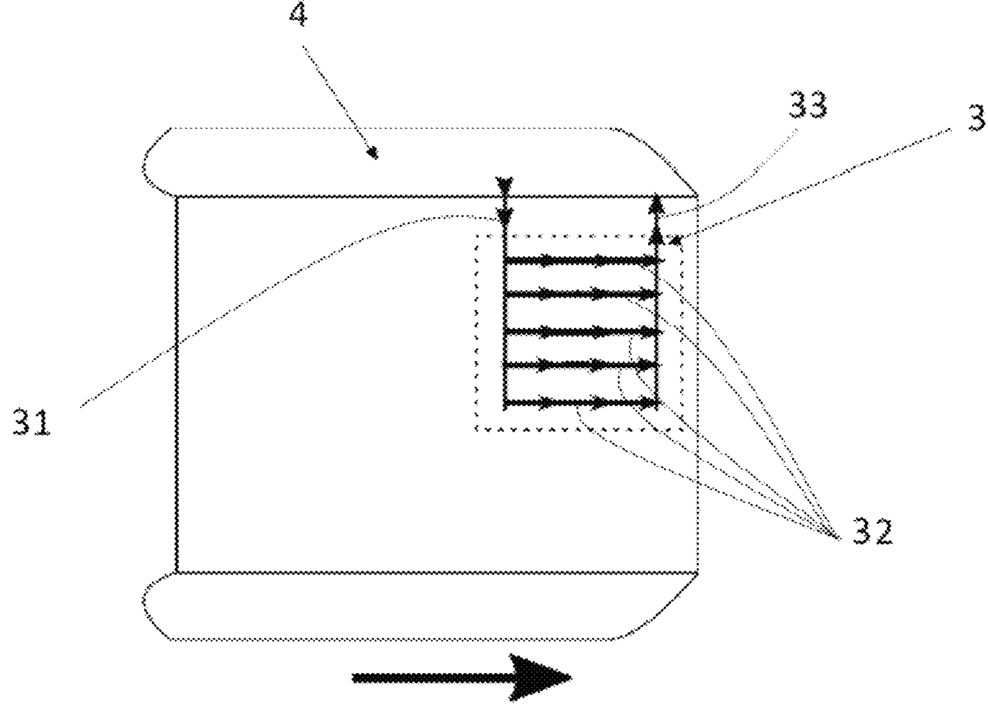

[Fig. 3]
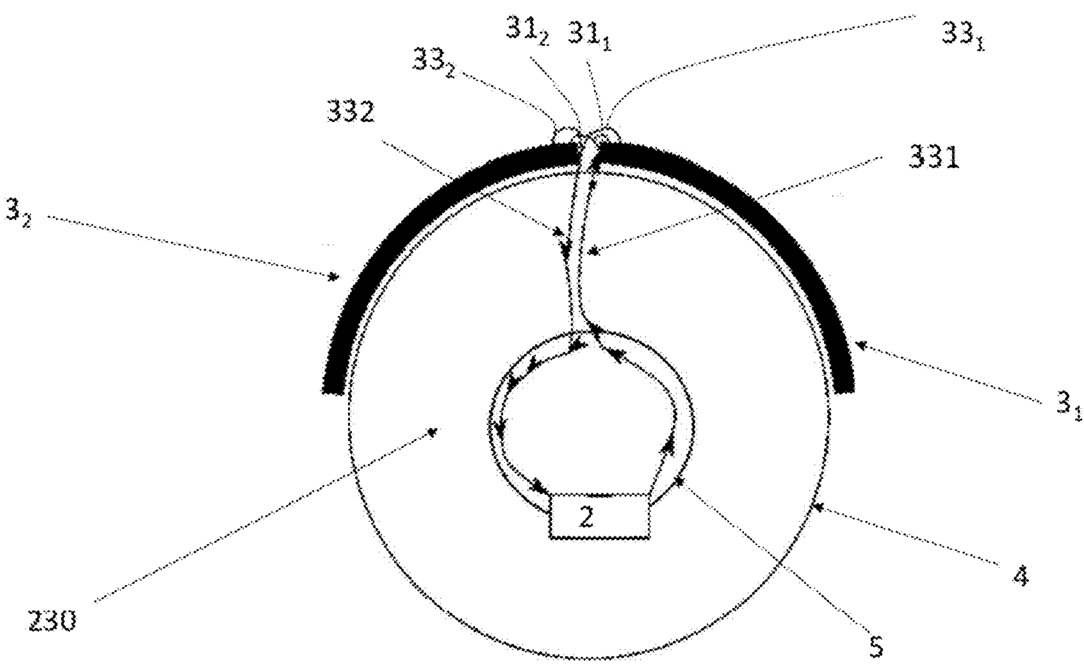
[Fig. 4]
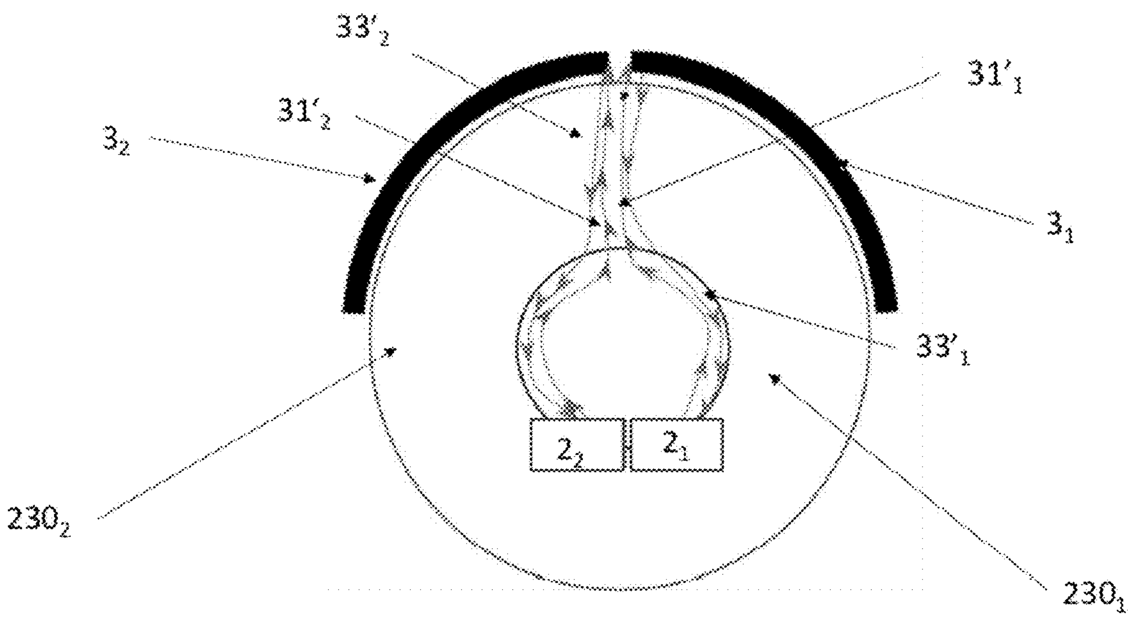

[Fig. 5]
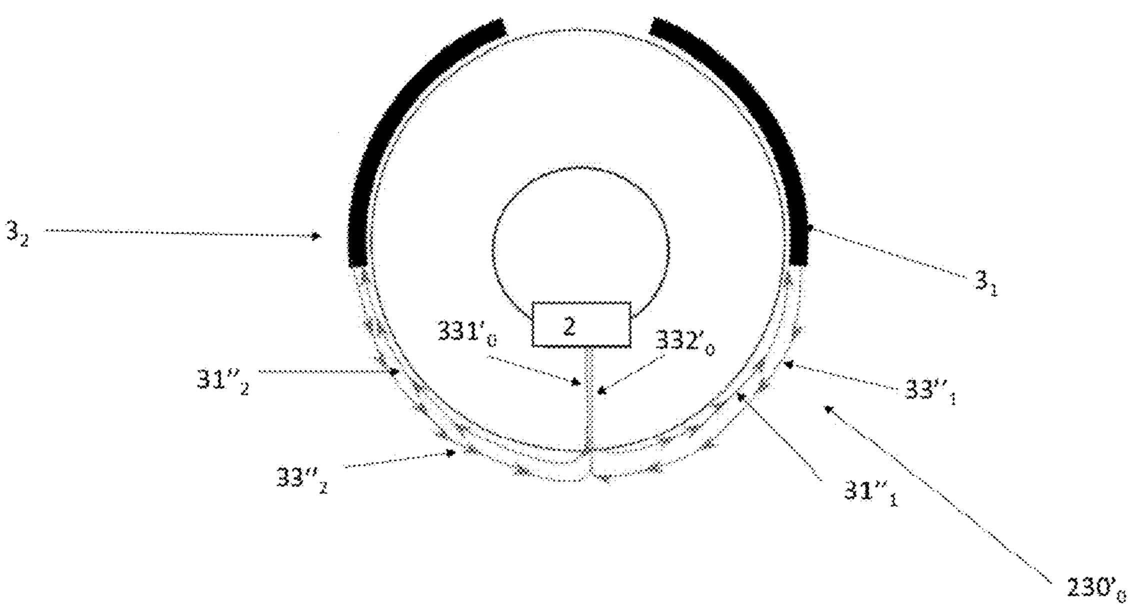
[Fig. 6]
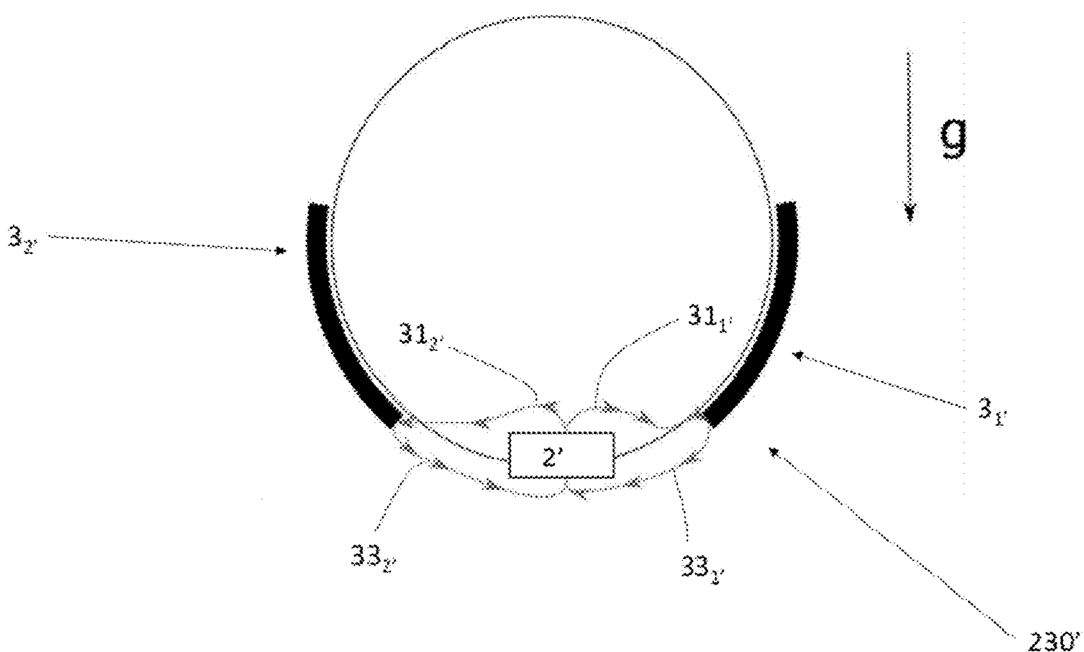

[Fig. 7]
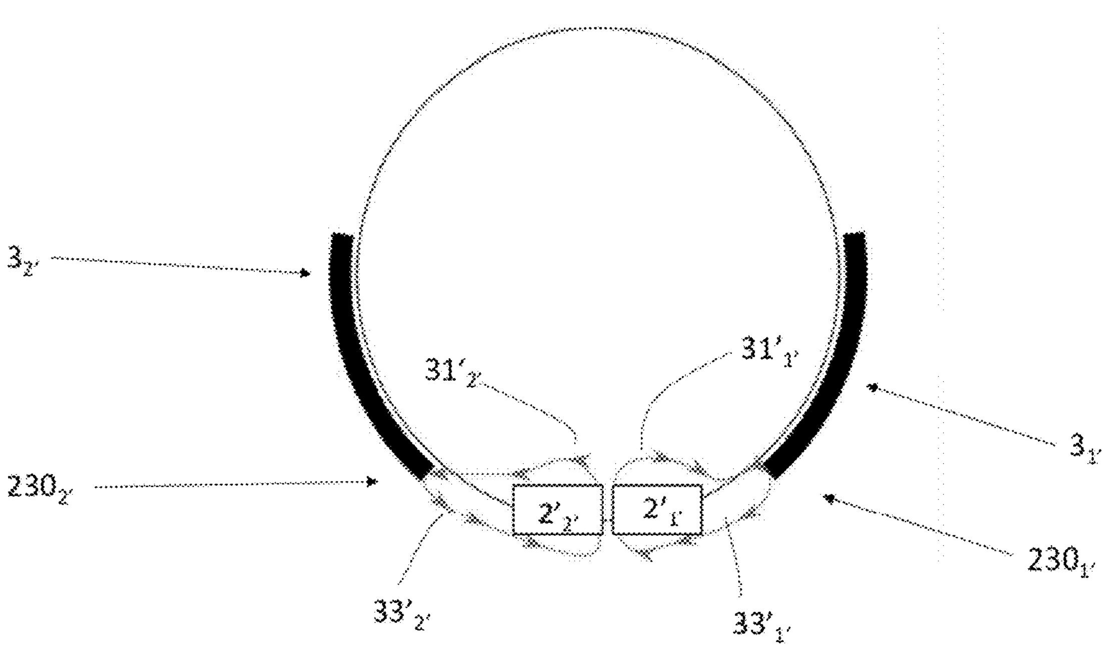
[Fig. 8]
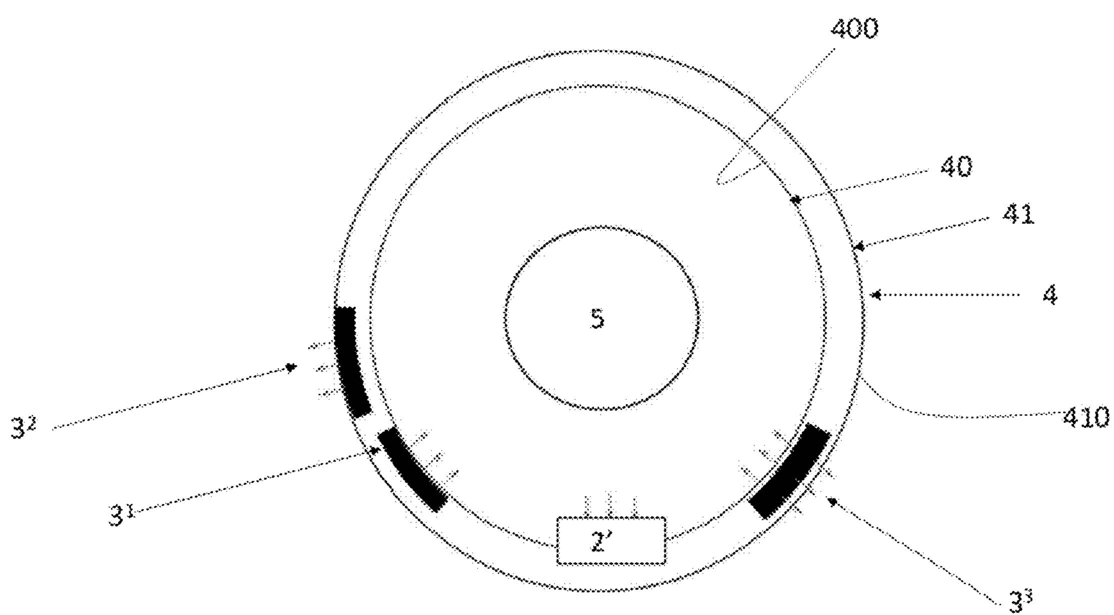

SYSTEM FOR COOLING A LIQUID FOR LUBRICATING AN AIRCRAFT TURBOMACHINE

CROSS-REFERENCE TO RELATED APPLICATIONS

This application is the U.S. National Stage of PCT/FR2022/052439, filed Dec. 20, 2022 which in turn claims priority to French patent application number 2114130 filed Dec. 21, 2021. The content of these applications are incorporated herein by reference in their entireties.

TECHNICAL FIELD OF THE INVENTION

The technical field of the invention is that of cooling a lubricating liquid, such as lubricating oil, in gas turbine engines.

The present invention generally relates to turbomachines, i.e. gas turbine engines, and more particularly to a cooling apparatus for transferring excess heat from a turbomachine.

TECHNOLOGICAL BACKGROUND OF THE INVENTION

Gas turbine engines use pressurised oil to lubricate and cool various components (e.g. bearings, transmission means etc.).

A lubricant distribution system is provided to ensure proper lubrication of these components and to cool them.

The lubricant (oil) picks up a lot of heat in the process which has to be rejected to keep the oil temperature within acceptable limits.

Consequently, the lubricant has also to be cooled via a heat exchanger.

To do this, a first known method consists in cooling the lubricant by circulation through an air/oil exchanger using air extracted from the secondary stream, known as the cold flux, of the nacelle. The extraction and circulation of air through this exchanger disturbs flow of the air flux and causes undesirable additional head losses. A cooling device is also known which includes a heat exchanger arranged on a wall delimiting the secondary stream, the fluid being cooled by the flow of air from the secondary stream which circulates along the surface of the exchanger.

A gas turbine engine is also known, comprising a nacelle comprising an external surface exposed to an external air flux and a cooling apparatus disposed in the nacelle comprising a plurality of heat pipes in parallel with one another.

Also known, for example, from document EP2819921, is a turboshaft engine nacelle equipped with an engine oil cooling system. The cooling system comprises a first circuit of a first heat transfer fluid, which may be a two-phase cooling liquid, serving as a cooling liquid for cooling a second fluid such as an engine lubricant (oil) in a heat exchanger mounted in the nacelle. The first circuit comprises a multitude of valves, a pump and cooling channels along the walls of the nacelle for heat exchange with the external air. The heat recovered by the heat exchange between the lubricant and the cooling liquid causes the same to evaporate upon starting circulation. The cooling liquid evaporated is then cooled to recondense, and gravity drives it downwardly of the nacelle where it is pumped back to the fluid/oil exchanger.

From document EP3487764, for example, a turboshaft engine nacelle including an active cooling device for a turboshaft engine is known. The active cooling device comprises a shell which forms a trailing edge and which is arranged at a downstream end of the nacelle delimited by an outer face which is subjected to an external air flow and by an inner face which is subjected to an internal air flow circulating in the secondary stream of the nacelle. The cooling device includes a plurality of heat exchange channels in the shell, through which a heat transfer fluid passes to dissipate heat conveyed by the heat transfer fluid. The cooling device includes an inlet manifold and an outlet manifold, and a source connected to both manifolds, each connected to an inlet and outlet end of each channel. The active cooling device comprises a pump for driving the fluid in circulation from the source to the channels.

However, these cooling devices require the heat transfer fluid to be conveyed into the channels, which conventionally requires a pump to drive the fluid in circulation from the source to the channels. Furthermore, in these two-phase loops, there is a need to control superheating at the evaporator outlet as well as undercooling at the condenser outlet. A tank is needed at the pump inlet to avoid the presence of vapour and thus ensure that liquid is pumped during all phases of flight, in order to avoid any risk of cavitation. The pump and its associated tank are detrimental to the weight and energy consumption of the system.

To avoid circulating oil directly in the nacelle surfaces, a passive cooling apparatus is also known, each heat pipe of which has an elongate outer wall with closed ends in which a heat transfer fluid is trapped. The engine further comprises a heat exchanger mounted outside the casing in which oil from an engine lubrication system enters the heat exchanger via a recovery duct. One of the ends is located in the heat exchanger. In this cooling apparatus, each heat pipe is therefore independent, resulting in non-homogeneity of the work of the volumes of heat transfer fluid in the different channels, thus reducing the cooling performance for the total volume of heat transfer fluid with respect to the examples described previously, in which the total heat transfer fluid circulates in all the cooling channels (closed circulation loop).

There is therefore a need for an improved cooling system that is simple and efficient, while reducing energy consumption and weight.

SUMMARY OF THE INVENTION

The invention offers a solution to the problems previously discussed, by making it possible to use a heat transfer loop comprising a capillary pumping system. The capillary effect of a porous wick in an evaporator makes it possible to bring the heat transfer fluid into the gas phase and to generate a capillary pressure which compensates for all the head losses in the loop. The capillary pressure should be greater than all the head losses in the system, otherwise mechanical pumping would be necessary, as in prior art.

One aspect of the invention relates to a system for cooling a lubricating liquid of an aircraft turbomachine comprising:

- A heat exchanger comprising a first cooling volume for the lubricating liquid,
- a first circuit for cooling a two-phase heat transfer fluid by means of a thermo-capillary pumped two-phase fluid circulation loop, comprising:
  - a first condenser comprising:
    - a vapour inlet for the heat transfer fluid in the vapour state,
    - channels extending along a first outer surface of a nacelle of the turbomachine to cool the channels, the channels being connected in parallel with one another, to enable the fluid the fluid circulating in the condenser to be cooled from a vapour state to a liquid state, a liquid outlet for the heat transfer fluid in the liquid state, a first capillary evaporator of the heat exchanger, to absorb heat from the first volume in which the lubricating liquid circulates, the first evaporator comprising:

a first volume comprising a liquid inlet for the heat transfer fluid connected to the liquid outlet of the first condenser, a second volume comprising a vapour outlet of the heat transfer fluid, connected to the vapour inlet of the first condenser a capillary porous wick located between the first volume and the second volume, for separating the two-phase fluid between a liquid phase and a gas phase by a capillary pressure rise.

By virtue of the invention, the use of a capillary pumping system makes it possible to impose a direction of circulation for the fluid in (each) condenser, which allows increase in the cooling capacity of the cooling liquid and therefore of the oil by using the space and surface of the nacelle in different phases of flight of an aircraft, while reducing the weight and energy required to operate the first circuit of the heat transfer fluid. Furthermore, the use of a two-phase fluid circulation loop instead of a single-phase fluid reduces amount of heat transfer fluid to be circulated in the cooling circuit. This thus makes it possible to reduce total mass of the heat transfer fluid and therefore of the cooling system.

Further to the characteristics just discussed in the previous paragraph, the cooling system according to one aspect of the invention may have one or more additional characteristics from among the following, considered individually or according to all technically possible combinations:

According to one embodiment, the heat transfer fluid comprises a volume of between 30 and 70% of the cooling circuit in the liquid state.

According to one embodiment, the cooling system comprises a second condenser similar to the first condenser, wherein the first and second condensers are located on either side of a vertical plane comprising the axis of the nacelle.

According to one example of this embodiment, the first cooling circuit for the two-phase heat transfer fluid comprises the second condenser comprising its vapour inlet connected to the vapour outlet of the second volume of the first evaporator. In this example, the first and second condensers are thus in parallel (fluid circulation).

According to another example of this embodiment, the cooling system comprises:

a second capillary evaporator of the heat exchanger, similar to the first capillary evaporator, a second cooling circuit for a two-phase heat transfer fluid similar to the first cooling circuit for a two-phase heat transfer fluid, the second cooling circuit comprising the second condenser which comprises its vapour inlet connected to the vapour outlet of the second volume of the second evaporator.

According to one embodiment, the first condenser is located higher than the first evaporator so that the fluid in a liquid state at the condenser outlet circulates by gravity towards the evaporator. This enables gravity to be used to promote circulation of the heat transfer fluid in the cooling circuit.

According to one embodiment, the cooling system comprises a vapour duct connecting the vapour outlet of the second volume of the first evaporator to the vapour inlet of the first condenser, the vapour duct being situated along the axis of the nacelle upstream of the inlet of the first evaporator.

According to one embodiment, the heat exchanger is located in a bottom part of the nacelle located below the turbomachine.

According to one embodiment which is an alternative to the previous embodiment, the heat exchanger is located in a central compartment of the turbomachine surrounded by the nacelle, the cooling circuit comprising a vapour duct connecting the vapour outlet of the second volume of the first evaporator to the vapour inlet of the first condenser by passing inside a support arm of the turbomachine.

According to one embodiment, the first condenser is located in a top part of the nacelle located above the axis of the turbomachine.

According to one embodiment which is an alternative to the previous embodiment, the first condenser is located in a bottom part of the nacelle located below the axis of the turbomachine.

According to one embodiment, the first outer surface of the nacelle is a surface of an external wall of the nacelle forming the outer periphery of the nacelle.

According to one embodiment which is an alternative to the previous embodiment, the first outer surface of the nacelle is a surface of an internal wall of the nacelle which externally delimits a secondary flow stream of the turbomachine.

According to one embodiment, the nacelle comprises an inner wall and an outer wall surrounding the inner wall, the outer wall comprising the first outer surface and the inner wall comprising an outer surface, the channels extend between a first and a second wall comprising the first outer surface of the nacelle, and the channels extend between the outer surface of the inner wall and the first outer surface of the nacelle.

According to one example of this embodiment, the channels extend in contact with the outer wall of the nacelle.

According to another example of this embodiment, the channels extend in contact with the inner wall of the nacelle.

According to another example of this embodiment, the channels extend between the inner wall and the outer wall of the nacelle. According to one implementation, the channels are radially substantially the same distance from the outer surface of the inner wall as from the outer surface of the outer wall. (By radially substantially the same distance, it is meant between +10% and −10% of the distance).

According to one embodiment, the channels of the first capacitor are superimposed in the nacelle to form a grid which follows the curvature of the first outer surface of the nacelle.

According to one embodiment, the capillary pressure rise in the capillary porous wick makes it possible to compensate for the sum of the head losses undergone by the fluid in the first condenser circuit.

another aspect of the invention relates to a propulsion assembly comprising a turbomachine and a nacelle surrounding the turbomachine, support arms connecting the nacelle to a central compartment, and a system for cooling a lubricating liquid of the turbomachine according to the first aspect of the invention (with or without the different possible combinations of the embodiments and examples, described previously), the cooling system comprising a closed circuit of the lubricating liquid comprising the first cooling volume of the lubricating liquid in the heat exchanger, a volume of the engine connected to an inlet and an outlet of the first cooling volume of the lubricating liquid in the heat exchanger, and a pump mounted between the volume of the engine and the first cooling volume of the lubricating liquid in the heat exchanger, for circulating the lubricating liquid in the closed circuit.

The invention and its different applications will be better understood upon reading the following description and upon examining the accompanying figures.

BRIEF DESCRIPTION OF THE FIGURES

The figures are set forth by way of indicating and in no way limiting purposes of the invention.

FIG. 1 shows a schematic diagram of a cooling system according to the invention.

FIG. 2 shows a schematic diagram of a condenser in a nacelle of a cooling system according to one example of the invention.

FIG. 3 shows a schematic diagram of a cooling system according to a first example of a first embodiment of the invention comprising two condensers according to the example of FIG. 2.

FIG. 4 shows a schematic diagram of a cooling system according to a second example of the first embodiment of the invention comprising two condensers according to the example of FIG. 2.

FIG. 5 shows a schematic diagram of a cooling system according to a third example of the first embodiment of the invention comprising two condensers according to the example of FIG. 2.

FIG. 6 shows a schematic diagram of a cooling system according to a first example of a second embodiment of the invention comprising two condensers according to the example of FIG. 2.

FIG. 7 shows a schematic diagram of a cooling system according to a second example of a second embodiment of the invention comprising two condensers according to the example of FIG. 2.

FIG. 8 shows a schematic diagram of different radial locations of the condenser of FIG. 2 in a nacelle of a cooling system according to one example of the invention.

DETAILED DESCRIPTION

The figures are set forth by way of indicating and in no way limiting purposes of the invention.

Unless otherwise specified, a same element appearing in different figures has a single reference.

FIG. 1 shows a schematic diagram of a system according to the invention for cooling a lubricating liquid of an aircraft turbomachine.

The cooling system according to the invention comprises a first cooling volume 201 for the lubricating liquid of a heat exchanger 213 and a first cooling circuit 230 for a two-phase heat transfer fluid via a thermo-capillary pumped two-phase fluid loop. The lubricating liquid circulates in a closed lubricating liquid circuit 120 and loses heat in the heat exchanger 213, which is recovered by a two-phase heat transfer fluid to cool the lubricating liquid.

The use of a two-phase fluid loop instead of a single-phase fluid loop (where in the latter the fluid remains in the liquid state) makes it possible to use less dense working fluids, thereby also reducing the mass of the system. Indeed, in a single-phase loop, there is a restriction to some types of fluid that do not undergo a phase change over the entire pressure/temperature range corresponding to the different phases of flight. Fluids which meet this criterion are generally dense.

In FIG. 1, the closed circuit 120 of a propulsion assembly comprising the turbomachine for lubricating this turbomachine can be schematically seen. The closed circuit 120 comprises an engine 1 in which the lubricating liquid from the turbomachine circulates, the heat exchanger 213 and a pump 12. The closed circuit 120 for the lubricating liquid therefore comprises the first cooling volume 201 of the lubricating liquid in the heat exchanger 213, a volume of the engine 1 connected to an inlet and outlet of the first cooling volume of the lubricating liquid in the heat exchanger 213 and the pump 12 which is mounted between the volume of the engine 1 and the first cooling volume 201 of the lubricating liquid in the heat exchanger 213, for circulating the lubricating liquid in the closed circuit 120. The pump 12 is here represented between the outlet of the volume of the engine 1 and the inlet of the first volume 201 of the heat exchanger 213 because in this example the first volume 201 of the heat exchanger 213 may be located higher in the propulsion assembly mounted to the aircraft than the volume of the engine 1 but could also be mounted between the outlet of the first cooling volume 201 of the heat exchanger 213 and the inlet of the volume of the engine 1 in the opposite case, where it is the volume of the engine 1 that is located higher in the propulsion assembly mounted on the aircraft than the first cooling volume 201 of the heat exchanger 213. The engine 1 may comprise a tank for the lubricating liquid of the engine 1 connected to the pump 12 and one or more nozzles or lubricating liquid on mechanical pieces of the engine.

By high or low (top or bottom) in the application, reference is made to the direction of gravity for an aircraft propulsion assembly such that the landing gear deployed is lower than the aircraft propulsion assembly.

The first cooling circuit 230 for the two-phase heat transfer fluid comprises a first condenser 3 and a first capillary evaporator 2 of the heat exchanger 213 comprising a capillary porous wick 200.

The capillary evaporator 2 generates the driving pressure responsible for moving the two-phase heat transfer fluid throughout the loop. The heat to be dissipated from the lubricating liquid (engine oil, for example) is transferred to the heat transfer fluid within this capillary evaporator 2. The capillary evaporator 2 comprises a first volume 203 comprising a liquid inlet for the heat transfer fluid and a second volume 223 comprising a vapour outlet for the heat transfer fluid, the porous wick 200 is the element which separates the second volume 223 (the two-phase heat transfer fluid in the vapour state) from the first volume 203 (the two-phase heat transfer fluid in the liquid state). The porous wick 200 contains pores which, by splitting the vapour-liquid interface, produce a capillary pressure rise corresponding to the difference between the pressures of the liquid and vapour phases. The excess pressure of the vapour above the vaporisation surface causes this vapour to migrate towards the condenser, causing the heat transfer fluid to move in the loop as soon as the capillary pressure rise compensates for the sum of the head losses experienced by the fluid in the entire loop. According to a first embodiment of the cooling system, the heat exchanger 213 can be integrated directly into a central compartment 5 delimited by a casing of the engine 1 of the turbomachine, as explained in the examples of the first embodiment described below with reference to FIGS. 3 to 5. The heat exchanger 213 according to a second embodiment of the cooling system can be located within a nacelle 4 of the propulsion assembly at the "bottom" part as explained below in the examples of the second embodiment with reference to FIGS. 6 to 8.

In the following, identical characteristics are designated by the same references, and characteristics which are different in the second embodiment from those in the first embodiment are designated by the same number supplemented at the end of the same number by an inverted comma "'".

In this figure, the evaporator 2 is represented according to a schematic diagram by comprising a porous wick forming a rectilinear wall separating both volumes forming chambers, but the porous wick 200 may, for example, be hollow and separate the first volume 203 by surrounding the second volume 223. For example, the porous wick 200 may be a hollow cylinder.

In FIGS. 3 to 5, the capillary evaporator 2 according to the first embodiment makes it possible to reduce amount of the lubricating liquid in the closed circuit 120 and increase that of the heat transfer fluid. This has the advantage of reducing the total mass (part of the heat transfer fluid is in vapour form).

The cooling system can comprise two cooling circuits $\mathbf{230_1}$, $\mathbf{230_2}$, $\mathbf{230_{1'}}$, $\mathbf{230_{2'}}$ as represented in the examples of FIGS. 3 and 7 respectively of the first and second embodiment, each comprising a capillary evaporator $\mathbf{2'_1}$, $\mathbf{2'_2}$, $\mathbf{2'_{1'}}$, $\mathbf{2'_{2'}}$. References of the characteristics of the first cooling circuit, $\mathbf{230_1}$, $\mathbf{230_{1'}}$, are completed by a subscript "1" and references of the characteristics of the second cooling circuit $\mathbf{230_2}$, $\mathbf{230_{2'}}$ are completed by a subscript "2".

The first cooling circuit 230 may comprise two condensers 3 as in the different examples represented in each of FIGS. 3 to 8 of the first and second embodiments.

FIG. 2 represents one example of a condenser 3 in a nacelle 4. The condenser 3 comprises a vapour inlet for the heat transfer fluid in vapour state, i.e. an inlet via which the heat transfer fluid arrives in vapour phase in the condenser, connected to a first vapour duct 31, i.e. a duct wherein the heat transfer fluid circulates in vapour phase. The condenser 3 further comprises channels 32 extending along a first outer surface of the turbomachine nacelle 4 for cooling them. The channels are connected in parallel. The channels 32 are superimposed in the nacelle 4 to form a grid which follows the curvature of the first outer surface of the nacelle, thus making it possible to cool the fluid in the vapour state circulating in the condenser 3 and thus to shift it to the liquid state before it leaves the condenser.

The condenser 3 thus comprises a liquid outlet for the heat transfer fluid, i.e. an outlet through which the heat transfer fluid leaves the condenser in the liquid phase, connected to a first liquid duct 33, i.e. a duct in which the heat transfer fluid circulates in the liquid phase.

The first cooling circuit 230 thus comprises the liquid duct 33 connected to the liquid outlet of the condenser 3 and to the liquid inlet of the first volume 203 of the capillary evaporator 2 to transfer to it the heat transfer fluid in the liquid state cooled in the condenser 3. The vapour duct 31 is connected to the vapour outlet of the second volume 223 of the capillary evaporator 2 and to the vapour inlet of the condenser 3 to transfer to it the heat transfer fluid in the vapour state heated in the capillary evaporator 2.

The first example of the first embodiment represented in FIG. 3 will now be described.

In this first example of this first embodiment, as previously described, the capillary evaporator 2 is mounted in a central compartment 5 delimited by a casing of the engine 1, and the first cooling circuit 230 comprises two condensers $\mathbf{3_1}$, $\mathbf{3_2}$ located on either side of a vertical plane comprising the axis of rotation of the turbomachine surrounded by the nacelle 4. The nacelle 4 surrounding the turbomachine engine comprises support arms, not represented, connected to the engine. In this embodiment, the two condensers $\mathbf{3_1}$, $\mathbf{3_2}$ are each mounted in an top part of the nacelle 4. By top part of the nacelle 4, it is meant the part above a horizontal plane passing through the axis of rotation of the turbomachine. By horizontal plane, it is meant that the axis of rotation of the turbomachine is horizontally aligned.

In this first example, the first cooling circuit 230 comprises a main vapour duct 331 and a main liquid duct 332 each extending on either side of the peripheral length of the central compartment 5 and in one of the support arms extending upwards from the nacelle 4.

The main vapour duct 331 is connected at its end on the one hand to the outlet of the second volume 223 of the capillary evaporator 2 and its other end on the other hand to a first vapour duct $\mathbf{31_1}$ and to a second vapour duct $\mathbf{31_2}$ each connected to the first and second condensers $\mathbf{3_1}$, $\mathbf{3_2}$ respectively to connect them to the outlet of the second volume 223 of the capillary evaporator 2.

The main liquid duct 332 is connected at its end on the one hand to the inlet of the first volume 203 of the capillary evaporator 2 and its other end on the other hand to a first liquid duct $\mathbf{33_1}$ and to a second liquid duct $\mathbf{33_2}$ each connected respectively to the first and second condensers $\mathbf{3_1}$, $\mathbf{3_2}$.

Thus having the two condensers in the top part makes it possible to use gravity to return the heat transfer fluid in the liquid state to the capillary evaporator 2.

Furthermore, having the two condensers on either side of the vertical plane means that at least one of the two condensers is more efficient when the aircraft displaces through a long turn producing rotation about the roll axis of the aircraft.

The second example of the first embodiment of the cooling system represented in FIG. 4 is different from this first example in that it includes a second cooling circuit $\mathbf{230_2}$ and a second capillary evaporator $\mathbf{2_2}$ of the heat exchanger 213, similar to the first capillary evaporator $\mathbf{2_{1'}}$.

The heat exchanger 213 may comprise a second cooling volume for the lubricating liquid comprising this second capillary evaporator $\mathbf{2_2}$, separated from the first cooling volume 201 for the lubricating liquid, or may comprise this second capillary evaporator $\mathbf{2_2}$ in contact with the first cooling volume 201 in order to cool it.

In this second example, each cooling circuit $\mathbf{230_1}$, $\mathbf{230_2}$ is different from the first example in that they are free of main liquid duct and main vapour duct.

Thus the first and second cooling circuits $\mathbf{230_1}$, $\mathbf{230_2}$ comprise a first vapour duct $\mathbf{31'_1}$ and a second vapour duct $\mathbf{31'_2}$ respectively directly connected to the outlet of the second chamber 223 of the corresponding capillary evaporator $\mathbf{2_1}$, $\mathbf{2_2}$.

The first and second cooling circuits $\mathbf{230_1}$, $\mathbf{230_2}$ therefore also comprise a first liquid duct $\mathbf{33'_1}$ and a second liquid duct $\mathbf{33'_2}$ respectively directly connected to the inlet of the first chamber 203 of the corresponding capillary evaporator $\mathbf{2_1}$, $\mathbf{2_2}$.

The first and second vapour ducts $\mathbf{31'_1}$, $\mathbf{31'_2}$ and the first and second liquid ducts $\mathbf{33'_1}$, $\mathbf{33'_2}$ therefore each extend on either side of the peripheral length of the central compartment 5 and in one of the support arms.

Having two cooling circuits 230$_1$, 230$_2$ makes it possible to have two independent circuits thus allowing redundancy but also improvement in the event of a long turn of the aircraft (rotation about the roll axis).

The third example of the first embodiment of the cooling system represented in FIG. 5 is different from the first example in that the main vapour duct 331'$_0$, and the main liquid duct 332'$_0$ extend from the central compartment 5 in one of the support arms towards a bottom part of the nacelle 4 and in that the first vapour duct 31"$_1$, the second vapour duct 31"$_2$, the first liquid duct 33"$_1$, the second liquid duct 33"$_2$ each extend on either side along the periphery of a bottom part of the nacelle 4 towards the inlet and outlet of the corresponding condenser 3$_1$, 3$_2$.

The first example of the second embodiment of the cooling system represented in FIG. 6 will now be described.

As explained previously, the second embodiment is different from the first embodiment in that the heat exchanger 213 is located in the bottom part of the nacelle 4. Thus the capillary evaporator 2' is located in the bottom part of the nacelle 4. The first and second condensers 3$_{1'}$, 3$_{2'}$ are also located in the bottom part of the nacelle 4 such that the heat exchanger 213 is located between the first and second condensers 3$_{1'}$, 3$_{2'}$.

In this first exemplary embodiment, the cooling system has similarities to the second exemplary embodiment of the first embodiment in that they are free of a main liquid duct and a main vapour duct.

Thus in this first example, the first cooling circuit 230$_1$ comprises a first vapour duct 31$_{1'}$ and a second vapour duct 31$_{2'}$ in the bottom part of the nacelle 4, each connected to an outlet of the second volume 223 of the capillary evaporator 2' and to the inlet of the first and second condensers 3$_{1'}$, 3$_{2'}$ respectively.

The second example of the second embodiment of the cooling system represented in FIG. 7 is different from this first example in that it includes a second cooling circuit 230$_{2'}$ and a second capillary evaporator 2$_{2'}$ of the heat exchanger 213, similar to the first capillary evaporator 2$_{1'}$.

In this second example, the first cooling circuit 230$_{1'}$ thus comprises a first vapour duct 31'$_{1'}$ connected on the one hand to the outlet of the second volume 223 of the first evaporator 2'$_{1'}$ and on the other hand to the inlet of the condenser 3$_{1'}$ and a first liquid duct 33'$_{1'}$ connected on the one hand to the inlet of the first volume 203 of the first evaporator 2'$_{1'}$ and on the other hand to the outlet of the condenser 3$_{1'}$. The second cooling circuit 230$_{2'}$ thus comprises a second vapour duct 31'$_{2'}$ connected on the one hand to the outlet of the second volume 223 of the second evaporator 2'$_{2'}$ and on the other hand to the inlet of the second condenser 3$_{2'}$ and a second liquid duct 33'$_{2'}$ connected on the one hand to the inlet of the first volume 203 of the second evaporator 2'$_{2'}$ and on the other hand to the outlet of the second condenser 3$_{2'}$.

In this second embodiment, having the heat exchanger in the bottom part of the nacelle makes it possible to reduce the total head losses of the circulation loop of the heat transfer fluid.

FIG. 8 represents different examples representing different radial locations of the condenser 3 of FIG. 2 in a nacelle 4 of a cooling system according to one example of this second embodiment of the invention but could also be for the first embodiment.

The nacelle 4 comprises an inner wall 40 and an outer wall 41 surrounding the inner wall 40 each comprising an internal surface facing each other. The outer wall 41 comprises an outer surface 410 in contact with air around the nacelle 4 and the inner wall 40 comprises an outer surface 400 in contact with air surrounded by the nacelle 4.

The outer surface 400 of the inner wall 40 is therefore inside the nacelle 4 and externally delimits a secondary flow stream with the turbomachine. The outer surface 410 of the outer wall 41 of the nacelle 4 is an external surface forming the external periphery of the nacelle 4.

The condenser 3$_1$ is disposed so that the channels 32 extend along the outer surface 400 of the inner wall 40 of the nacelle 4, radially closer to the outer surface 400 of the inner wall 40 than to the outer surface 410 of the outer wall 41. The channels 32 are in this example located against the internal surface of the inner wall 40 but may, according to another example not represented, be located on the outer surface 400 of the inner wall 40 of the nacelle 4. In these two examples, this enables the heat transfer fluid to be cooled by air from the secondary flow of the turbomachine even when the aircraft is on the ground or taking off.

The condenser 3$_2$ represents a position in which the channels 32 extend along the outer surface 410 of the nacelle 4, and radially closer to the outer surface 410 of the outer wall 41 than to the outer surface of the inner wall 40. The channels 32 are in this example located against the inner surface of the outer wall 41 but may, according to another example not represented, be located on the outer surface 410 of the outer wall 41 of the nacelle 4. This allows the heat transfer fluid to be cooled by the outer air flux sweeping over the nacelle in particular when the aircraft is in flight.

The condenser 3$_3$ represents a position in which the channels 32 extend between the inner wall 40 and the outer wall 41 of the nacelle 4, and herein substantially as close radially to the outer surface 400 as to the outer surface 410. This enables the heat transfer fluid to be cooled by the outer air flow sweeping over the nacelle, in particular when the aircraft is in flight, but also by the secondary flow, in particular when the aircraft is on the ground or taking off.

The channels may also be located in the inner wall 40 and/or the outer wall 41.

In general, a condenser 3 will preferably be disposed at a higher level than a capillary evaporator 2, to take advantage of gravity in the heat transfer fluid circulation.

Unless otherwise specified, a same element appearing in different figures has a single reference.

The invention claimed is:

1. A system for cooling a lubricating liquid of an aircraft turbomachine comprising:

a heat exchanger comprising a first cooling volume for the lubricating liquid, a first circuit for cooling a two-phase heat transfer fluid by means of a thermo-capillary pumped two-phase fluid circulation loop, comprising:

a first condenser comprising:

1. a vapour inlet for the heat transfer fluid in the vapour state,
2. channels extending along a first outer surface of a nacelle of the turbomachine to cool the channels, the channels being connected in parallel with one another, to enable the fluid circulating in the condenser to be cooled from a vapour state to a liquid state,
3. a liquid outlet for the heat transfer fluid in the liquid state, a first capillary evaporator of the heat exchanger, to absorb heat from the first volume in which the lubricating liquid circulates, the first evaporator comprising:

1. a first volume comprising a liquid inlet for the heat transfer fluid connected to the liquid outlet of the first condenser,
2. a second volume comprising a vapour outlet for the heat transfer fluid, connected to the vapour inlet of the first condenser
3. a capillary porous wick located between the first volume and the second volume, for separating the two-phase fluid between a liquid phase and a gas phase by a capillary pressure rise.

2. The system for cooling the lubricating liquid of the aircraft turbomachine according to claim 1, comprising a second condenser similar to the first condenser, wherein the first and second condensers are located on either side of a vertical plane comprising an axis of the nacelle.

3. The system for cooling the lubricating liquid of the aircraft turbomachine according to claim 2, wherein the first cooling circuit for the two-phase heat transfer fluid comprises the second condenser comprising its vapour inlet connected to the vapour outlet of the second volume of the first evaporator.

4. The system for cooling the lubricating liquid of the aircraft turbomachine according to claim 2, comprising: a second capillary evaporator of the heat exchanger, a second cooling circuit for the two-phase heat transfer fluid comprising the second condenser which comprises its vapour inlet connected to the vapour outlet of the second volume of the second evaporator.

5. The system for cooling the lubricating liquid of the aircraft turbomachine according to claim 1, wherein the first condenser is located higher than the first evaporator so that the fluid in a liquid state at the outlet of the condenser circulates by gravity towards the first evaporator.

6. The system for cooling the lubricating liquid of the aircraft turbomachine according to claim 1, comprising a vapour duct connecting the vapour outlet of the second volume of the first evaporator to the vapour inlet of the first condenser, the vapour duct being located along the axis of the nacelle upstream of the inlet of the first evaporator.

7. The system for cooling the lubricating liquid of the aircraft turbomachine according to claim 1, wherein the heat exchanger is located in a bottom part of the nacelle located below the aircraft turbomachine.

8. The system for cooling the lubricating liquid of the aircraft turbomachine according to claim 1, wherein the heat exchanger is located in a central compartment of the aircraft turbomachine surrounded by the nacelle, the cooling circuit comprising a vapour duct connecting the vapour outlet of the second volume of the first evaporator to the vapour inlet of the first condenser, passing inside a support arm of the aircraft turbomachine.

9. The system for cooling the lubricating liquid of the aircraft turbomachine according to claim 1, wherein the first condenser is located in a top part of the nacelle located above an axis of the aircraft turbomachine.

10. The system for cooling the lubricating liquid of the aircraft turbomachine according to claim 1, wherein the first condenser is located in a bottom part of the nacelle located below an axis of the aircraft turbomachine.

11. An aircraft propulsion assembly comprising a system according to claim 1 for cooling the lubricating liquid of the turbomachine a nacelle surrounding the aircraft turbomachine, support arms connecting the nacelle to a central compartment of the aircraft turbomachine, the cooling system comprising a closed circuit of the lubricating liquid comprising the first cooling volume of the lubricating liquid in the heat exchanger, a volume of the engine connected to an inlet and an outlet of the first cooling volume of the lubricating liquid in the heat exchanger, and a pump mounted between the volume of the engine and the first cooling volume of the lubricating liquid of the heat exchanger, for circulating the lubricating liquid in the closed circuit.

12. The aircraft propulsion assembly according to claim 11, wherein the first outer surface of the nacelle is a surface of an external wall of the nacelle forming the outer periphery of the nacelle.

13. The aircraft propulsion assembly according to claim 11, wherein the first outer surface of the nacelle is a surface of an internal wall of the nacelle which externally delimits a secondary flow stream of the aircraft turbomachine.

* * * * *